United States Patent
Misewich et al.

(10) Patent No.: US 6,562,633 B2
(45) Date of Patent: May 13, 2003

(54) ASSEMBLING ARRAYS OF SMALL PARTICLES USING AN ATOMIC FORCE MICROSCOPE TO DEFINE FERROELECTRIC DOMAINS

(75) Inventors: James Misewich, Peekskill, NY (US); Christopher B. Murray, Ossining, NY (US); Alejandro G. Schrott, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 09/791,640

(22) Filed: Feb. 26, 2001

(65) Prior Publication Data

US 2002/0118369 A1 Aug. 29, 2002

(51) Int. Cl.[7] .............................................. H01L 21/00
(52) U.S. Cl. ............................ 438/3; 257/295; 369/126; 369/127; 369/128; 369/145; 369/146
(58) Field of Search .......................... 438/3; 369/126–8; 369/145–6; 257/295

(56) References Cited

U.S. PATENT DOCUMENTS

| | | | | | |
|---|---|---|---|---|---|
| 4,962,480 A | * | 10/1990 | Ooumi et al. | ............... | 365/151 |
| 5,132,934 A | * | 7/1992 | Quate et al. | ............... | 365/151 |
| 5,481,527 A | * | 1/1996 | Kasanuki et al. | ........... | 369/126 |
| 5,536,573 A | * | 7/1996 | Rubner et al. | ............. | 428/378 |
| 5,579,140 A | * | 11/1996 | Yamahara et al. | ............ | 359/75 |
| 5,757,061 A | * | 5/1998 | Satoh et al. | ................. | 252/532 |
| 5,793,743 A | * | 8/1998 | Duerig et al. | ............... | 369/126 |
| 5,880,360 A | * | 3/1999 | Hu et al. | ...................... | 73/105 |
| 5,918,274 A | * | 6/1999 | Chen et al. | ................... | 73/105 |
| 5,923,637 A | * | 7/1999 | Shimada et al. | ............ | 369/126 |
| 5,978,256 A | | 11/1999 | Sohn et al. | | |
| 6,064,587 A | * | 5/2000 | Jo | ............................... | 365/145 |
| 6,220,084 B1 | * | 4/2001 | Chen et al. | ................... | 73/105 |
| 6,281,677 B1 | * | 8/2001 | Cosci et al. | ................ | 324/212 |
| 6,387,530 B1 | * | 5/2002 | Liu et al. | .................... | 428/559 |
| 2002/0013667 A1 | * | 7/2002 | Zemer et al. | ................. | 702/57 |

FOREIGN PATENT DOCUMENTS

JP 8-304425 * 11/1996 .......... G01N/37/00

OTHER PUBLICATIONS

Wu et al. "The creation of nanometer magnetic domain structure in artificially pinning hole of magneto–optical recording material" IEEE Transactions on Magnetics, vol. 34, No. 4 part 1 Jul. 1998 p. 1994–96.*

Butera et al. "Temperature dependence of the coercivity of Fe films spurrered on nanochannel alumina" IEEE Transactions on Magnetics vol. 34 No. 4 part 1 Jul. 1998 p. 1024–26.*

* cited by examiner

Primary Examiner—Matthew Smith
Assistant Examiner—Granville D. Lee
(74) Attorney, Agent, or Firm—McGinn & Gibb, PLLC; Casey P. August

(57) ABSTRACT

A method of assembling arrays of small particles or molecules using an atomic force microscope to define ferroelectric domains includes depositing a ferroelectric thin film upon a substrate forming workpiece, then using an atomic force microscope having a conductive, tip for generating a pattern on this thin film to define desired nano-circuit patterns. Next, exposure of this thin film to a solution containing chemical species which selectively adsorb or accumulate under the influence of electrophoretic forces in selected regions of this thin film.

28 Claims, 1 Drawing Sheet

ASSEMBLING ARRAYS OF SMALL PARTICLES USING AN ATOMIC FORCE MICROSCOPE TO DEFINE FERROELECTRIC DOMAINS

BACKGROUND OF THE INVENTION

1. Field of the Invention

The present invention generally relates to structures with functional length scales measured in nanometers, and more particularly, to methods of making the same. The nanostructured assemblies may have application in electronic, optical, and magnetic storage devices.

2. Description of the Related Art

As the limits in miniaturization of silicon based electronic devices and magnetic storage systems appear on the horizon, new generations of nano-devices are attracting attention. Contenders in the nanoscale world of electronics and storage technology include single electron transistors, nanotubes, molecular wire crossbar memory, nanoscale patterned magnetic arrays and so on. Although significant switching characteristics have been demonstrated in these systems, the assembly, interconnection and addressing of such nanostructures for logic or memory chips, magnetic storage systems remains a formidable challenge. This is a consequence of the difficulties of manipulation of nanoscale elements even in a laboratory environment.

Previous methods of making submicron-based electronic devices have included electron beam lithographic techniques, the moving of nanoparticles using scanning tunneling microscopes (STM) to create an "electromechanical paintbrush" to transfer electroplatable material (see U.S. Pat. No. 5,865,878), nanoimprint lithography (microcontact printing) and other approaches that use molecular self-assembly. Unfortunately, the art lacks techniques that can modulate a nanoparticle/substrate interaction to selectively self-assemble nanoparticles or molecules in an effective manner.

SUMMARY OF THE INVENTION

Accordingly, the present invention is directed to a method for assembling arrays of small particles or molecules using an atomic force microscope to modulate a nanoparticle/substrate interaction to selectively self-assemble nanoparticles or molecules, wherein the method substantially obviates one or more of the problems due to limitations and disadvantages of the related art.

An object of the present invention is to provide a method for producing patterns for interconnections between devices in high density nanoscale electronic circuits or to selective patterned magnetic arrays for high density magnetic storage media. The invention provides advantages over conventional lithographic techniques used to assemble electronic devices or magnetic storage systems in the nanometer scale, or when moving the nanoparticle or molecules with atomic force microscope (AFM) tip. Direct manipulation or positioning of nanostructures with an AFM tip is difficult, requiring constant monitoring to assure the fidelity in the transport and delivery and attachment of the selected particle or molecule to desired position on the substrate. The method of the invention modulates the nanoparticle/substrate interaction to selectively self-assemble nanoparticles or molecules.

Stable ferroelectric domains on the nanometer scale can be prepared in various states of remnant polarization by means of an atomic force microscope (AFM) using a properly biased metal tip. This allows persistent patterning of the surface potential with nanoscale resolution which can then be used to draw the locus where the nanoparticles or molecules will be induced to assemble by the strong localized electrostatic interaction when deposited from a solution with non-polar solvent or where selective molecular decomposition in a chemical vapor deposition (CVD) process occurs. The invention assembles a pattern of nanoparticles or molecules for electronics applications by nanopatterning the surface potential of a ferroelectric thin film and using this surface potential to selectively adsorb the nanoparticles or molecules.

Primary features of the method are the ability to produce an arbitrary pattern of electric polarization at a free surface of a thin film, the exposure of this free surface to a solution containing chemical species that selectively adsorbs or accumulates under the influence of electrophoretic forces in a selected region of a substrate being processed. The molecules or particles may either be electrically charged species (electrophoretic) and there for attracted selectively to regions of charge opposite to their own. Alternatively, the species may be highly polarizable but uncharged and thus be attracted to areas with the high electric field gradients generated by the polarized surface regions (dielectrophoretic).

Thus, another object of the invention is to provide a method for assembling arrays of small particles using an atomic force microscope by depositing a ferroelectric thin film on a substrate; tracing a pattern on said ferroelectric thin film with said AFM thereby leaving a pattern of domains on said thin film; and exposing said ferroelectric thin film to a composition having nanosized particles, said particles coated with an organic species that selectively accumulate in said traced pattern of said thin film.

Additional features and advantages of the invention will be set forth in the description which follows, and in part will be apparent from the description, or may be learned by practice of the invention. The objectives and other advantages of the invention will be realized and attained by the method particularly pointed out in the written description, drawing and claims hereof.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
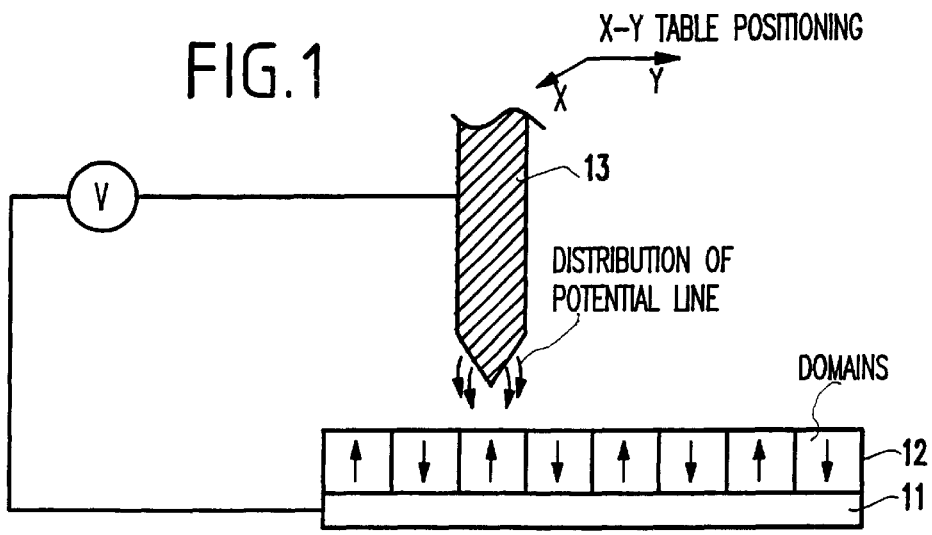
FIG. 1 is a schematic diagram illustrating the method of the invention.
Figure 2:
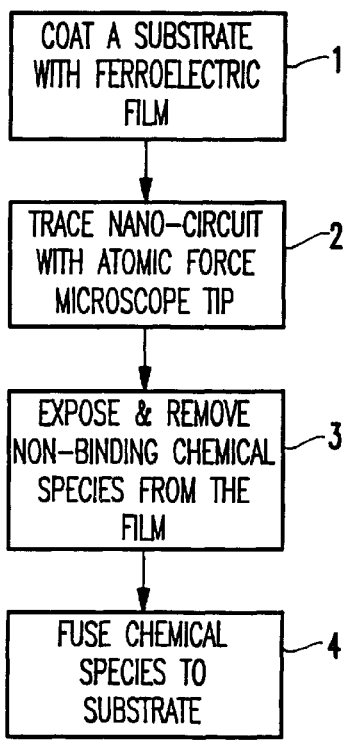
FIG. 2 is a flow diagram illustrating a preferred method of the invention.

In referring now to FIGS. 1 and 2, the invention provides a method of producing a structure by pre-patterning a surface with nanoscale resolution to assemble structures of nanoparticles, molecules, or localized products of molecular decomposition. Stable ferroelectric domains on the nanometer scale can be prepared in various states of remnant polarization by use of an atomic force microscope (AFM)

using a properly biased metal tip. This allows persistent patterning of the surface potential with nanoscale resolution which is then used to draw a locus where nanoparticles or molecules are induced to assemble by the strong localized electrostatic interaction when deposited from a solution with non-polar solvent, or where selective molecular decomposition in a CVD process occurs. The proximity of two oppositely polarized surface regions and the magnitude of the polarization can be adjusted to control the relative field strengths at the surface and thereby control the deposition of neutral but polarizable nanoparticle or molecules. This method is useful for fabricating circuits in the nanometer scale.

Scanning probe microscopy can now be used for observing nanosize structures having sizes less than 100 angstroms to even single atoms (around two angstroms). Up/down/neutral/control of ferroelectric domains can be controlled by use of such microscopes since their size is around 100 angstroms. The preferred probe microscope used for such purposes is an atomic force microscopes (AFM) that has a metallic tip. As shown in FIG. 1, ferroelectric polarization can be used to control these up, down or neutral domains of a ferroelectric film 12 using the metallic tip 13 of an AFM, and controlling movement of this tip to create polarization patterns on the film. Patterns are formed on the ferroelectric film 12 on a substrate 11 by inducing a remnant polarization at a domain of the ferroelectric film 12 using the conductive nano tip 13 that is subsequently processed by deposition of an electrostatically binding composition and subsequent removal of excess non-binding material.

Referring now to the invention shown in FIG. 2 at step 1, a ferroelectric thin film material 12 is coated on a substrate forming a workpiece. Any substrate with a conductive layer is suitable such that the conducting layer does not have to be in direct contact with the film 12. Examples of substrate materials include, but not limited to Si or $Al_2O_3$/Pt; Si or $Al_2O_3$/Pt/STO; Nb doped STO, and STO/SRO, wherein STO is an expression for $SrTiO_3$ and SRO is an expression for $SrRuO_3$. The film 12 is a ferroelectric material with a coercive field that permits inversion with a suitable voltage of the AFM tip, for example, a material, such as $Pb(Zr_xTi_{1-x})O_3$ (PZT); $Bi_4Ti_3O_{12}$; $SrBiTaO_3$; $SrBi_2NbTaO_9$; $SrBi_2Ta_2O_9$; $YMnO_3$; $Sr_{1-x}Ba_xNb_2O_6$ (See Mat. Res. Soc. Symp. Proc. Vol 433, Materials Research Soc. 1996). The tip 13 is an AFM conductive tip.

The invention at step 2 provides the requisite pattern control by movement of the tip 13 that is typically provided by relative positioning of an X-Y motor driven stage for accurate positioning above the workpiece.

At step 3, the ferroelectric thin film 12 is ready for subsequent processing wherein three-dimensional heterostructures are constructed as described in the following example of FIGS. 3a, 3b and 3c in which one exemplary form of fabricating lines of small conducting particles. Such particle alignment can be used to make conducting circuits in the nanoscale regime as shown in the following example.

Figure 3A:
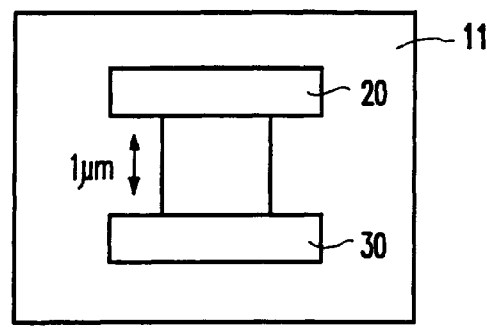
FIGS. 3a, 3b and 3c illustrate a sequence of making an exemplary nanowire device using the method of the invention.

FIG. 3a shows initial processing wherein a ferroelectric film is deposited, for example, by pulsed laser deposition on a conductive substrate 11, followed by the production of electrode structures using standard techniques well known in the art. The electrode structures consist of two metal electrodes 20, 30 which have a 1 micron separation on the ferroelectric film. Next, the exposed ferroelectric film is patterned into a 1 micron by 1 micron island 12 connected to the said electrodes, using lithographic and well known milling techniques.

Figure 3B:
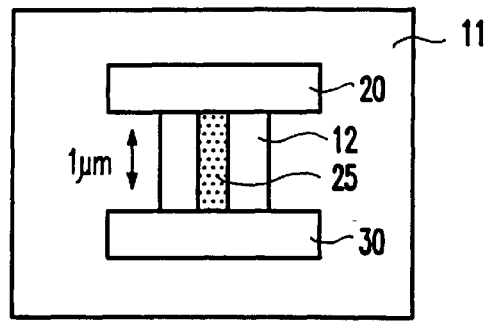
Figure 3C:
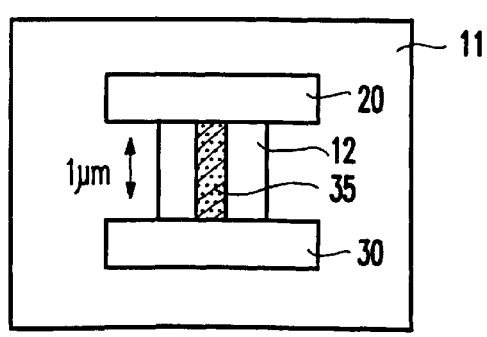

In FIG. 3b, the ferroelectric film 12 is scanned by an atomic force microscope by a conductive tip 13 that is biased with respect to the substrate 11. This allows selection of the remnant polarization in a ferroelectric domain directly under the tip. By scanning, patterns of remnant polarization can be made with nanoscale resolution by scanning with the AFM tip 13 for modulating a surface with positive, negative and neutral areas. Either the positive or negative domains are used for a desired structure to be formed. In the example, scanning negative in a desired patterned area leaves a desired ferroelectric remnant polarization trace 25 where a wire will be formed and the surrounding areas are unpolarized. The patterned ferroelectric 25 thereafter has a pattern in the surface potential. This enhances or impedes the adsorption of a nanoparticle or molecule via strong electrostatic interaction when the substrate is exposed to a nonpolar solution/suspension. Excess non-binding material is subsequently washed away. Thus, an array of nanoparticles can be assembled as shown in FIG. 3c showing an assembly of nanoparticles 35 from a nonpolar solution, (the particles can be prepared following the method of Murray et al., e.g., FePt particles coated by oleic acid and oley amine groups in a hexane solution (Science (USA) Vol. 287, No. 5460, Mar. 17, 2000, pages 1989–91). Next, fusing by the above method is performed by raising the temperature and decomposing the organic coating of the particles, yielding a nanowire interconnection between two electrodes. Alternatively, a more robust connection can be achieved afterwards by means of selective chemical vapor deposition (CVD) of metals following for example the method of K. Tsubouchi et al. (Thin Solid Films, 228, 312 (1993)) for deposition of aluminum. This method uses dimethylaluminuum hydride [DMAH; $(CH_3)_2AlH$] and $H_2$, and is highly selective. The DMAH molecule decomposes and deposits when adsorbed on a surface capable of sustaining free electrons (i.e., a metal), and it does not deposit on an insulating surface. Thus by following this method, one can selectively deposit Al on the lines defined by the alignment of the small nanoscale particles and make narrow but thicker metallic lines.

In a second example for implementing step 3 of FIG. 2, the thin ferroelectric film is ready for subsequent processing wherein three-dimensional heterostructures are constructed that can use methods disclosed in Rubner et al.'s U.S. Pat. Nos. 5,518,767 and 5,536,573, entitled "Molecular self-assembly of electrically conductive polymers hereby incorporated by reference. These patents provide techniques for selective adsorption of polyionic species at uniformly charged surfaces, wherein a surface is prepared to have a net positive or negative charge. Next the charged surface is exposed to a solution containing ionic species, cations if the surface was negatively charged and conversely anions if the original surface was negatively charged. The subsequent adsorption of the ions compensates the initial charge imbalance and sets up an electrical double layer, which now presents a charge opposite to the original surface polarization. Exposing this surface to a new solution containing anions of opposite charge to the first ionic solution results in the selective adsorption of a second chemical layer and the reestablishment of an electrical double layer, which reverses the polarity of the surface. Repetition of these selective adsorption steps leads to the controlled production of the multilayer in which the chemical character of each layer and the number of repeat units can be precisely controlled. This nanometer scale modulation of chemical character has been used for the preparation of organic LEDs and organic field effect transistors (FETS) using this two-dimensional layering procedure.

The use of the present invention for initial patterning of the structures using the conductive tip 13 in steps 1 and 2 above, for patterning the surface of a ferroelectric film provides advantages over these techniques disclosed in U.S. Pat. Nos. 5,518,767 and 5,536,573 when used alone. In particular, the ability to produce arbitrary submicron regions of positive, negative or neutral surface charge allow for the growth of films that can be modulated in three-dimension, not only perpendicular to a substrate forming two-dimensional layers. In the second example, a ferroelectric surface patterned with positively charged regions and with neutral regions is treated according to a third method disclosed in U.S. Pat. Nos. 5,518,767 and 5,536,573, which require a positively charged surface for alternative adhesion of the doped polypyrrole and sulfonated polystyrene layers. Thus, the positively charged regions of the pattern will be coated with the conductive layers, and the neutral regions are not, whereby lines of organic conductors are readily created.

Adsorption of chemical species on selected regions of the substrate provide a new class of nanoporous materials where the pore size and pore spacing are tuneable by the polarization template created on the surface of a substrate. The chemical species which adsorb could be chosen such that they can be activated and polymerized upon thermal, photochemical or chemical initiation. At this point, excess material is removed from the substrate and ready for a final step of fusing the three-dimensional heterostructures to the substrate.

At step 4 shown in FIG. 2, fusing of these compositions occur by polymerization/cross-linking of the adsorbed species so as to lock-in the lateral modulation created by the patterned surface charge, making the newly formed surface layer a continuous membrane.

The use of the invention provides a membrane that can function as a chemically selective filter for a variety of sensor applications in which the detailed structure of the membrane composition and size and spacing of the pores could be engineered to optimize selectivity and sensitivity of the sensor. The surface assembled membrane could in turn be employed as a contact mask for subsequent wet etching or dry etching (ion milling or reactive ion etching) process with transfer the pattern of the membrane into the underling substrate. Additionally, once this contiguous fused membrane of modulated films is formed, it can be transferred to a new surface. If the final chemical layered deposited in growing the film has a high affinity for adhesion to another surface, such a film can be transferred by placing the film in contact with another substrate, and after sufficient treatments to enhance the adhesion of this film to the new surface, the two nano-structures can be pulled apart with the prepared film remaining attracted to the new surface and delaminating from the original patterned ferroelectric film. The original patterned substrate could then be used again to prepare another film and provide for a repeated process that allows for repetitive replication of a surface patterning achieved in the traced patterned film.

While the invention has been described in terms of preferred embodiments, those skilled in the art will recognize that the invention can be practiced with modification within the spirit and scope of the appended claims.

What is claimed is:

1. A method for assembling arrays of small particles using an atomic force microscope (AFM), said method comprising:

depositing a ferroelectric film layer on a substrate;
   tracing a pattern on said ferroelectric film with said AFM thereby leaving a traced pattern of charged and uncharged domains on said film; and
   exposing said ferroelectric film to a composition having nanosized particles, said particles coated with an organic species that selectively accumulate in said traced pattern of said film.

2. The method of claim 1, wherein said exposure of said film includes initially selecting said composition that comprises a solution that includes chemical species of nanosized dielectric particles selected from a group consisting of metallic and semiconductor materials.

3. The method of claim 1, wherein said tracing is provided by an X-Y motor driven stage for maintaining relative positioning between a tip member of said AFM and said substrate.

4. The method of claim 3, wherein said tracing includes selection of a tip that is a conductive tip member comprising a material that is selected from the group consisting of silicon and tungsten.

5. The method of claim 3, wherein said tracing includes scanning with a negative, positive and neutral bias by said tip forming a requisite pattern on said substrate by remnant polarization in ferroelectric domains under said tip.

6. The method of claim 1, wherein said coating of said substrate includes selecting said film material having a small coercive field.

7. The method of claim 6, wherein said selection of said film is from a group consisting of $Pb(Zr_xTi_{1-x})O_3$ (PZT); $Bi_4Ti_3O_{12}$; $SrBiTaO_3$; $SrBi_2NbTaO_9$: $SrBi_2Ta_2O_9$; $YMnO_3$; and $Sr_{1-x}Ba_xNb_2O_6$.

8. The method of claim 1, wherein said exposing of said ferroelectric film to a composition includes selecting an electrostatically charged composition which comprises a solution containing chemical species that selectively accumulate by electrophoretic forces in said traced patterns of said ferroelectric film.

9. The method of claim 1, wherein said exposing of said ferroelectric film to a composition includes selecting a highly polarizable composition that comprises a solution containing chemical species that selectively accumulate by dielectrophotetic forces in said traced patterns of said film.

10. A method for assembling strays of small particles using an atomic force microscope (AFM), said method comprising:

depositing a ferroelectric film layer on a substrate;
    tracing a pattern on said ferroelectric film with said AFM thereby leaving a traced pattern of charged and uncharged domains on said film;
    exposing said ferroelectric film to a composition having nanosized particles, said particles coated with an organic species that selectively accumulate in said traced pattern of said film; and
    wherein said method forms conductive nanowires in a nano-sized circuit by heating said deposited nanosized particles so as to make an electrical contact.

11. The method of claim 9, wherein said method forms conductive leads in a nano-sized circuit by depositing additional metal by selective chemical vapor deposition.

12. A method of producing three-dimensional submicron heterostructures on a workpiece, said method comprising:

tracing a modulated pattern on a ferroelectric film layer on said workpiece by an atomic force microscope; and
    adsorbing a chemical species on said pattern, wherein said tracing creates a polarization template on said ferroelectric film.

13. The method of claim 12, wherein said adsorbed chemical species at said selected regions of said workpiece are is a material characterized by properties that allow fusing by activated polymerization by a method selected from a group consisting of thermal, photochemical and chemical initiation.

14. The method of claim 13 further comprising:
providing a second workpiece;
transferring said adsorbed chemical species at said selected regions of said workpiece to said second workpiece; and
treating said adsorbed chemical species to enhance adhesion of said adsorbed chemical species to said second workpiece.

15. The method of claim 14 further comprising repeatedly using said first workpiece as a template.

16. The method of claim 12, wherein said tracing includes AFM scanning, with a negative, positive and neutral bias, a tip of said AFM forms said pattern on said substrate by remnant polarization in a ferroelectric domain in said film.

17. The method of claim 16, wherein said tracing is provided by an X-Y table for maintaining relative positioning between said tip of said AFM and said substrate.

18. The method of claim 17, wherein said tracing includes selection of a tip comprising a material selected from the group consisting of silicon and tungsten.

19. The method of claim 12, wherein said coating of said substrate includes selecting said film material having a small coercive field.

20. The method of claim 19, wherein said selection of said film is from a group consisting of Pb(Zr$_x$Ti$_{1-x}$)O$_3$ (PZT); Bi$_4$Ti$_3$O$_{12}$; SrBiTaO$_3$; SrBi$_2$NbTaO$_9$: SrBi$_2$Ta$_2$O$_9$; YMnO$_3$; and Sr$_{1-x}$Ba$_x$Nb$_2$O$_6$.

21. A method for assembling arrays of small particles using an atomic force microscope (AFM), said method comprising:
depositing a ferroelectric film layer on a substrate;
tracing a pattern on said ferroelectric film with said AFM thereby leaving a traced pattern of charged and uncharged domains on said film; and
exposing said ferroelectric film to a composition having nanosized particles, said particles coated with an organic species that selectively accumulate in said traced pattern of said film, wherein said exposure of said film includes initially selecting said composition that comprises a solution that includes chemical species of nano sized dielectric particles selected from a group consisting of metallic and semiconductor materials.

22. The method of claim 21, wherein said tracing is provided by an X-Y motor driven stage for maintaining relative positioning between a tip member of said AFM and said substrate.

23. The method of claim 22, wherein said tracing includes selection of a tip that is a conductive tip member comprising a material that is selected from the group consisting of silicon and tungsten.

24. The method of claim 21, wherein said coating of said substrate includes selecting said film material having a small coercive field.

25. The method of claim 24, wherein said selection of said film is from a group consisting of Pb(Zr$_x$Ti$_{1-x}$)O$_3$ (PZT); Bi$_4$Ti$_3$O$_{12}$; SrBiTaO$_3$; SrBi$_2$NbTaO$_9$: SrBi$_2$Ta$_2$O$_9$; YMnO$_3$; and Sr$_{1-x}$Ba$_x$Nb$_2$O$_6$.

26. The method of claim 21, wherein said exposing of said ferroelectric film to a composition includes selecting a highly polarizable composition that comprises a solution containing chemical species that selectively accumulate by dielectrophotetic forces in said traced patterns of said film.

27. A method for assembling arrays of small particles using an atomic force microscope (AFM), said method comprising:
depositing a ferroelectric film layer on a substrate;
tracing a pattern on said ferroelectric film with said AFM thereby leaving a traced pattern of charged and uncharged domains on said film;
exposing said ferroelectric film to a composition having nanosized particles, said particles coated with an organic species that selectively accumulate in said traced pattern of said film, wherein said exposure of said film includes initially selecting said composition that comprises a solution that includes chemical species of nanosized dielectric particles selected from a group consisting of metallic and semiconductor materials; and
wherein said method forms conductive nanowires in a nano-sized circuit by heating said deposited nanosized particles so as to make an electrical contact.

28. The method of claim 27, wherein said method forms conductive leads in a nano-sized circuit by depositing additional metal by selective chemical vapor deposition.

* * * * *